(12) United States Patent
Yamazaki et al.

(10) Patent No.: US 6,186,664 B1
(45) Date of Patent: Feb. 13, 2001

(54) BEARING DEVICE

(75) Inventors: Mitsuru Yamazaki; Kazuei Hoshino; Hisashi Nozawa; Hiroshi Yoshii, all of Ojiya (JP)

(73) Assignee: Nippon Bearing Company, Ltd., Niigata-ken (JP)

( * ) Notice: Under 35 U.S.C. 154(b), the term of this patent shall be extended for 0 days.

(21) Appl. No.: 09/300,404

(22) Filed: Apr. 27, 1999

(30) Foreign Application Priority Data

Apr. 30, 1998 (JP) .................................................. 10-120458

(51) Int. Cl.[7] ...................................................... F16C 29/06
(52) U.S. Cl. ................................................................ 384/43
(58) Field of Search ................................................. 384/43

(56) References Cited

U.S. PATENT DOCUMENTS

| | | | |
|---|---|---|---|
| 4,339,157 | * 7/1982 | Olschewski et al. | 384/43 |
| 4,443,042 | * 4/1984 | Walter et al. | 384/43 |
| 4,717,264 | * 1/1988 | Walter et al. | 384/43 |
| 4,952,075 | 8/1990 | Rogers, III | 384/43 |
| 5,346,313 | * 9/1994 | Ng | 384/43 |
| 5,433,530 | 7/1995 | Waskiewicz | 384/206 |
| 5,558,442 | 9/1996 | Ng | 384/43 |
| 5,836,702 | 11/1998 | Whiddon et al. | 384/584 |

FOREIGN PATENT DOCUMENTS

| | | |
|---|---|---|
| 652 809 | 11/1985 | (CH) . |
| 41 41 986 A1 | 6/1993 | (DE) . |
| 42 18 981 A1 | 12/1993 | (DE) . |
| 10-299768 | 11/1998 | (JP) . |

* cited by examiner

*Primary Examiner*—Thomas R. Hannon
(74) *Attorney, Agent, or Firm*—Pollock, Vande Sande & Amernick, RLLP

(57) ABSTRACT

A bearing device is provided in which a contact portion between centering plates of an outer sleeve and a housing would neither be abraded nor deformed and which is superior in practicality, reduction of weight, durability and mass production even if the housing is made of synthetic resin and light in weight. The bearing device includes the housing (2) into which an outer sleeve (1) is inserted and a shaft (3) inserted into the outer sleeve (1). The housing (2) with the outer sleeve (1) is slidable in a linear relative to the shaft (3). The outer sleeve (1) has a ball endless recirculation path defined by a loading portion and a non-loading portion. Balls (5) are arranged in the ball endless recirculation path by a retainer (4). Centering plates (6) which may move finely are provided in the outer sleeve (1). The housing (2) is made of synthetic resin and a portion with the centering plates (6) are brought into contact when the outer sleeve (1) is mounted on the housing (2) is made of anti-abrasion material (7) such as metal.

16 Claims, 2 Drawing Sheets

BEARING DEVICE

BACKGROUND OF THE INVENTION

The present invention relates to a light-weight bearing device having a housing made of synthetic resin.

A bearing device is composed of an outer sleeve, a housing into which the outer sleeve is inserted and a shaft inserted into the outer sleeve so that the housing with the outer sleeve is slidable in a linear fashion relative to the shaft. In particular, in a certain type of bearing device in which centering plates made of metal for performing automatic centering of the outer sleeve by a fine motion is provided, the outer sleeve is made of synthetic resin and the housing is made of metal (stainless steel in many cases).

The reason for this is as follows: Since an outward load is imposed to the centering plate provided on the outer sleeve by the contact of balls with the shaft when the housing with the outer sleeve is slidably moved in the linear fashion, if the housing would be made of synthetic resin, the contact portions between the housing and the centering plates would be worn and deformed so that there would be a fear that the outer sleeve and the housing would not come into intimate contact with each other with a rattle.

However, if the housing is made of synthetic resin, it is possible to considerably reduce the weight of the housing with the outer sleeve. In addition, it is advantageous to considerably enhance the productivity since the housing molding may be performed in an integral manner with molds.

SUMMARY OF THE INVENTION

In view of the above-noted defects, an object of the present invention is to provide a bearing device in which a contact portion between centering plates of an outer sleeve and a housing would neither be abraded nor deformed and which is superior in practicality, reduction of weight, durability and mass production even if the housing is made of synthetic resin.

According to the present invention, there is provided a bearing device comprising a housing into which an outer sleeve is inserted and a shaft inserted into the outer sleeve, wherein the shaft and the housing with the outer sleeve are relatively slidable in a linear fashion, characterized in that the outer sleeve has a ball endless recirculation path defined by a loading portion and a non-loading portion, balls are arranged in the ball endless recirculation path by a retainer, centering plates which may move finely are provided in the outer sleeve, the housing is made of synthetic resin, and a portion with the centering plates are brought into contact when the outer sleeve is mounted on the housing is made of anti-abrasion material such as metal.

According to another aspect of the invention, there is provided a bearing device comprising a housing into which an outer sleeve is inserted and a shaft inserted into the outer sleeve, wherein the shaft and the housing with the outer sleeve are relatively slidable in a linear fashion, characterized in that the outer sleeve has a ball endless recirculation path defined by a loading portion and a non-loading portion, balls are arranged in the ball endless recirculation path by a retainer, centering plates for supporting the balls at the loading portion from the outside are floatingly movable in through-windows formed in the outer sleeve, the housing is made of synthetic resin, and a portion with the centering plates are brought into contact when the outer sleeve is mounted on the housing is made of anti-abrasion material such as metal.

Also, in the bearing device according to the first or second aspect of the invention, according to a third aspect of the invention, the anti-abrasion material is formed into a ring.

Also, in the bearing device according to the second aspect of the invention, according to a fourth aspect of the invention, the centering plates have a projection at an intermediate portion in a longitudinal direction, respectively, and the projection of the centering plate is brought into contact with the anti-abrasion material.

In the bearing device according to any one of the first to fourth aspects of the present invention, according to a fifth aspect of the invention, pull-apart preventing members for preventing the outer sleeve from being pulled apart are provided on the front and rear side of the outer sleeve mounted on the housing.

In the bearing device according to the fifth aspect of the invention, the pull-apart preventing members are melt-bonded and formed integrally with recess portions formed in the housing.

For instance, when the housing with the outer sleeve is linearly moved relative to the shaft, an outward load is applied to the centering plate provided in the outer sleeve. However, since the contact portion of the housing against the centering plate is made of anti-abrasion material such as metal, there is no deformation or wear. Accordingly, there is no rattle between the outer sleeve and the housing.

With such an arrangement according to the present invention, it is possible to provide a bearing device in which a contact portion between centering plates of an outer sleeve and a housing would neither be abraded nor deformed and which is superior in practicality, reduction of weight, durability and mass production even if the housing is made of synthetic resin and light in weight.

DESCRIPTION OF THE PREFERRED EMBODIMENTS

Figure 1:
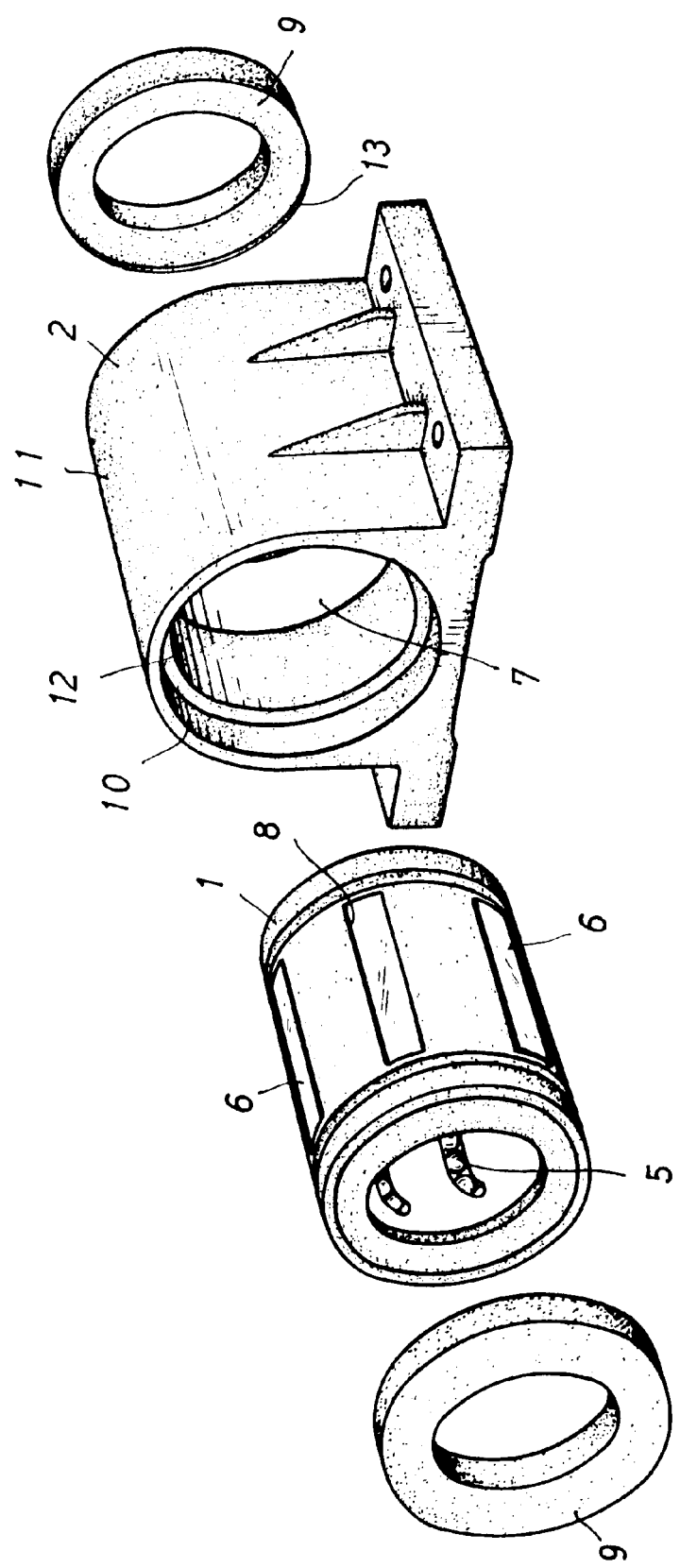
FIG. 1 is an exploded perspective view showing a bearing device according to the present invention.
Figure 2:
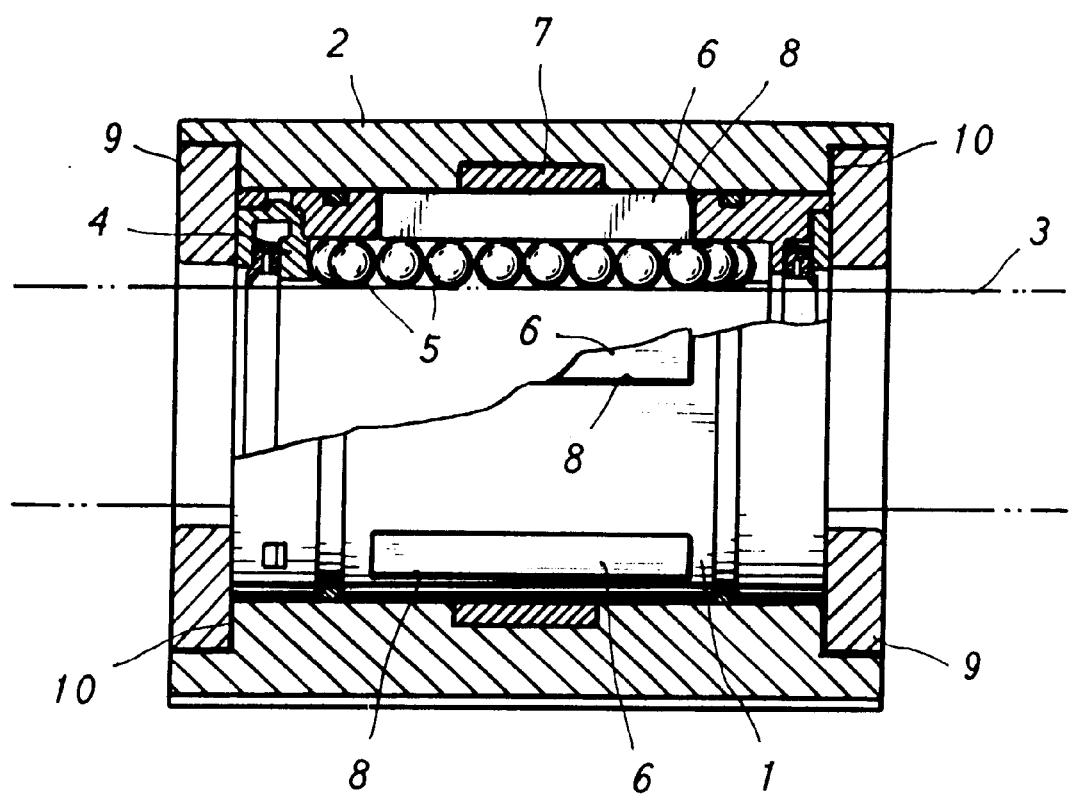
FIG. 2 is a partially cross-sectional view showing the bearing device shown in FIG. 1.

An embodiment of the present invention will now be described with reference to the accompanying drawings.

In the embodiment, a bearing device is composed of a housing 2 into which a cylindrical outer sleeve 1 is inserted and a shaft 3 inserted into the outer sleeve 1 so that the housing 2 with the outer sleeve 1 is slidably in a linear fashion relative to the shaft 3. The outer sleeve 1 has a ball endless recirculation path defined by a load portion and a non-load portion. Balls 5 are arranged in the ball endless recirculation path by a retainer 4. Centering plates 6 for supporting the balls 5 located in the load portion position from the outside are disposed floatingly in through-holes 8 formed in an outer surface of the outer sleeve 1. On the other hand, the housing 2 is made of synthetic resin. When the outer sleeve 1 is fitted to the housing 2, the portion with which the above-described centering plates 6 are brought into contact is made of anti-abrasion material 7 such as steel, stainless steel, aluminum or ceramic.

The housing 2 is composed of a housing body portion 11 and an inner diameter ring portion 12 interposed between the housing body portion 11 and the outer sleeve 1. A ring-shaped anti-abrasion material 7 is provided on the inner diameter ring portion 12.

Also, in the case where such a type of an outer sleeve 1 that an intermediate portion of each centering plate 6 in the longitudinal direction is projected is used, the anti-abrasion member 7 is provided at least at a portion with which the intermediate portion of the centering plate 6 in the longitudinal direction is to be brought into contact. Also, the anti-abrasion material 7 is not always provided for the entire portion with which the centering plate 6 is brought into contact. It is however possible to provide the anti-abrasion material to prevent the wear or deformation of the housing 2.

Pull-apart preventing portions 9 for preventing the back-and-forth movement of the outer sleeve 1 mounted on the housing 2 (inner diameter ring portion 12) and preventing the outer sleeve 1 from pulling apart are provided on the housing 2. The pull-apart preventing portions 9 are engaged with recess portions 10 formed in the housing 2.

Two method for producing the two articles according to the embodiment will now be described in detail.

<First Production Method>

The housing 2 in which the housing body portion 11 and the inner diameter ring portion 12 are formed together integrally is integrally formed of synthetic resin by an injecting molding machine. In this case, the anti-abrasion member 7 is arranged at a predetermined position (inner diameter ring portion 12) before the curing of the synthetic resin by an insert molding method.

Subsequently, the outer sleeve 1 manufactured in a different step is mounted on the housing 2, and the pull-apart preventing 9 are engaged with the recess portions 10 of the housing 2. If a structure is taken in which a melting portion 13 is provided in each pull-apart preventing portion 9 as shown and the melting portion 13 is molten to be bonded to the recess portion 10 by an ultra micro wave melt-bonding method, it is possible to manufacture the housing 2 with outer sleeve 1, which is much superior in rigidity with the integral structure of the housing 2 and the pull-apart preventing portions 9. Also, although not shown, it is possible to use fastening means such as snap rings for fastening the pull-apart preventing portions 9.

This first production method is superior in mass production since the housing 2 is integrally formed.

<Second Production Method>

The housing body portion 11 and the inner diameter ring portion 12 are made of different kinds of synthetic resin. Also, the inner diameter ring portion 12 is composed of two separate members (first inner diameter ring member and second inner diameter ring member) for clamping the anti-abrasion member 7 from both ends. Also, a portion corresponding to the first inner diameter ring member may be formed integrally with the housing body portion 11 in advance.

Subsequently, the pull-apart preventing portion 9 is tentatively fixed to the recess portion 10 on the side of either one of the front and rear of the housing body portion 11. In order from the other side, the first inner diameter ring member, the anti-abrasion member 7 and the second inner diameter ring member are mounted to form the inner ring portion 12. The outer sleeve 1 is mounted on the housing body portion 11 (inner diameter ring portion 12).

Subsequently, the pull-apart preventing portion 9 is engaged with the other recess portion 10 of the housing body portion 11. In the same manner as in the first production method, the pull-apart preventing portion 9 is fixed to the housing 2.

The second production method is inferior in mass production to the first production method but the user may use the outer sleeve 1 and the housing 2 in combination as desired to enhance versatility.

With such a structure according to the present invention, the bearing device is superior in mass production and light in weight since the housing 2 is made of synthetic resin. Also, since the contact portion between the housing 2 and the centering plates 6 of the outer sleeve 1 is made of anti-abrasion material 7, the contact portion is neither deformed nor abraded. There is no fear that there would be rattle between the outer sleeve 1 and the housing 2. Thus, the bearing device is superior in practicality, reduction of weight, durability and productivity.

Also, since the anti-abrasion member 7 is shaped into a ring, it is unnecessary to position the anti-abrasion member 7 in any radial direction. Furthermore, the anti-abrasion member 7 may be brought into contact with all the centering plates 6 provided in the outer sleeve 1. Thus, the bearing device is much superior in practicality and mass production.

Also, since the anti-abrasion member 7 is provided at a position where the anti-abrasion member 7 is brought into contact with an intermediate portion of each centering plate 6 in the longitudinal direction, it is possible to design the housing 2 to have a light weight as much as possible. The load which is caused by contacting the balls 5 in the loading portion with the shaft 3 and delivered through the centering plate 6 is positively received by the anti-abrasion member 7. Thus, the bearing device is much superior in practicality, reduction of weight and durability.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A bearing device comprising a housing into which an outer sleeve is inserted and a shaft inserted into said outer sleeve, wherein said shaft and said housing with said outer sleeve are relatively slidable in a linear fashion, characterized in that said outer sleeve has a ball endless recirculation path defined by a loading portion and a non-loading portion, balls are arranged in said ball endless recirculation path by a retainer, centering plates which may move finely are provided in said outer sleeve, said housing is a monolithic unit of synthetic resin having an inner surface that is substantially cylindrical in shape and hollow therethrough and capable of enclosing said outer sleeve within its inner surface, and an anti-abrasion material, is arranged within said housing between the opposing contact points of said centering plates and said housing.

2. The bearing device according to claim 1, wherein pull-apart preventing members for preventing said outer sleeve and said housing from being pulled apart are provided on the front and rear side of said outer sleeve mounted on said housing.

3. The bearing device according to claim 1, wherein the anti-abrasion material is formed into a ring.

4. The bearing device according to claim 3, wherein pull-apart preventing members for preventing said outer sleeve and said housing from being pulled apart are provided on the front and rear side of said outer sleeve mounted on said housing.

5. A bearing device comprising a housing into which an outer sleeve is inserted and a shaft inserted into said outer sleeve, wherein said shaft and said housing with said outer sleeve are relatively slidable in a linear fashion, characterized in that said outer sleeve has a ball endless recirculation path defined by a loading portion and a non-loading portion, balls are arranged in said ball endless recirculation path by a retainer, centering plates for supporting said balls at said loading portion from the outside are floatingly movable in through-windows formed in said outer sleeve, said housing is a monolithic unit of synthetic resin having an inner surface that is substantially cylindrical in shape and hollow therethrough and capable of enclosing said outer sleeve within its inner surface, and an anti-abrasion material, is arranged within said housing between the opposing contact points of said centering plates and said housing.

6. The bearing device according to claim 5, wherein pull-apart preventing members for preventing said outer sleeve and said housing from being pulled apart are provided on the front and rear side of said outer sleeve mounted on said housing.

7. The bearing device according to claim 5, wherein the centering plates have a projection at an intermediate portion in a longitudinal direction, respectively, and the projection of the centering plate is brought into contact with the anti-abrasion material.

8. The bearing device according to claim 7, wherein pull-apart preventing members for preventing said outer sleeve and said housing from being pulled apart are provided on the front and rear side of said outer sleeve mounted on said housing.

9. The bearing device according to claim 5, wherein the anti-abrasion material is formed into a ring.

10. The bearing device according to claim 9, wherein pull-apart preventing members for preventing said outer sleeve and said housing from being pulled apart are provided on the front and rear side of said outer sleeve mounted on said housing.

11. The bearing device according to claim 9, wherein the centering plates have a projection at an intermediate portion in a longitudinal direction, respectively, and the projection of the centering plate is brought into contact with the anti-abrasion material.

12. The bearing device according to claim 11, wherein pull-apart preventing members for preventing said outer sleeve and said housing from being pulled apart are provided on the front and rear side of said outer sleeve mounted on said housing.

13. A bearing device comprising a housing into which an outer sleeve is inserted and a shaft inserted into said outer sleeve, wherein said shaft and said housing with said outer sleeve are relatively slidable in a linear fashion, characterized in that said outer sleeve has a ball endless recirculation path defined by a loading portion and a non-loading portion, balls are arranged in said ball endless recirculation path by a retainer, centering plates which may move finely are provided in said outer sleeve, said housing is made of synthetic resin, an anti-abrasion material, is arranged within said housing between the opposing contact points of said centering plates and said housing, pull-apart preventing members for preventing said outer sleeve and said housing from being pulled apart are provided on the front and rear side of said outer sleeve mounted on said housing, wherein said pull-apart preventing members are melt-bonded and formed integrally with recess portions formed in said housing.

14. A bearing device comprising a housing into which an outer sleeve is inserted and a shaft inserted into said outer sleeve, wherein said shaft and said housing with said outer sleeve are relatively slidable in a linear fashion, characterized in that said outer sleeve has a ball endless recirculation path defined by a loading portion and a non-loading portion, balls are arranged in said ball endless recirculation path by a retainer, centering plates which may move finely are provided in said outer sleeve, said housing is a monolithic unit of synthetic resin having an inner surface that is substantially cylindrical in shape and hollow therethrough and capable of enclosing said outer sleeve within its inner surface, and a metal anti-abrasion material is arranged within said housing between the opposing contact points of said centering plates and said housing.

15. A bearing device comprising a housing into which an outer sleeve is inserted and a shaft inserted into said outer sleeve, wherein said shaft and said housing with said outer sleeve are relatively slidable in a linear fashion, characterized in that said outer sleeve has a ball endless recirculation path defined by a loading portion and a non-loading portion, balls are arranged in said ball endless recirculation path by a retainer, centering plates for supporting said balls at said loading portion from the outside are floatingly movable in through-windows formed in said outer sleeve, said housing is a monolithic unit of synthetic resin having an inner surface that is substantially cylindrical in shape and hollow therethrough and capable of enclosing said outer sleeve within its inner surface, and a metal anti-abrasion material is arranged within said housing between the opposing contact points of said centering plates and said housing.

16. A bearing device comprising a housing into which an outer sleeve is inserted and a shaft inserted into said outer sleeve, wherein said shaft and said housing with said outer sleeve are relatively slidable in a linear fashion, characterized in that said outer sleeve has a ball endless recirculation path defined by a loading portion and a non-loading portion, balls are arranged in said ball endless recirculation path by a retainer, centering plates which may move finely are provided in said outer sleeve, said housing is made of synthetic resin, a metal anti-abrasion material is arranged within said housing between the opposing contact points of said centering plates and said housing, pull-apart preventing members for preventing said outer sleeve and said housing from being pulled apart are provided on the front and rear side of said outer sleeve mounted on said housing, wherein said pull-apart preventing members are melt-bonded and formed integrally with recess portions formed in said housing.

* * * * *